United States Patent
Stevens

(10) Patent No.: US 7,541,928 B2
(45) Date of Patent: Jun. 2, 2009

(54) SYSTEM AND METHOD FOR VISIBILITY TO CONSUMER

(75) Inventor: John K. Stevens, Stratham, NH (US)

(73) Assignee: Visible Assets, Inc, Mississauga, Ontario (CA)

( * ) Notice: Subject to any disclaimer, the term of this patent is extended or adjusted under 35 U.S.C. 154(b) by 96 days.

(21) Appl. No.: 11/563,126

(22) Filed: Nov. 24, 2006

(65) Prior Publication Data

US 2007/0268137 A1 Nov. 22, 2007

Related U.S. Application Data

(60) Provisional application No. 60/597,341, filed on Nov. 25, 2005.

(51) Int. Cl.
*G08B 13/14* (2006.01)
(52) U.S. Cl. .............. 340/572.1; 340/572.4; 340/572.7; 340/10.1; 340/825.36; 340/539.13; 705/26
(58) Field of Classification Search .............. 340/572.1, 340/572.4, 10.1, 539.13, 825.36, 10.4, 539.32, 340/825.49, 286.11, 572.7; 235/375, 385; 705/26, 22
See application file for complete search history.

(56) References Cited

U.S. PATENT DOCUMENTS

| | | | |
|---|---|---|---|
| 6,988,079 B1 * | 1/2006 | Or-Bach et al. | 705/28 |
| 7,323,989 B2 * | 1/2008 | Allen | 340/572.1 |
| 7,364,070 B2 * | 4/2008 | Chang | 235/383 |
| 2003/0144926 A1 * | 7/2003 | Bodin et al. | 705/28 |

* cited by examiner

*Primary Examiner*—Anh V La
(74) *Attorney, Agent, or Firm*—Larson & Anderson, LLC

(57) ABSTRACT

A system for use by a bricks-and-mortar retailer has RF tags on items of merchandise ("item tags") and has large antennas in large areas of a retail space. Intermediate tags are communicatively coupled to the large antennas and also to the item tags. The locations of the intermediate tags are known, and thus the location of an item is known because it is communicatively coupled with one of the intermediate tags. A customer visits a web site and orders an item for later pickup at the store. Store personnel then go to the location of the item, pick the item, and put it at a store location for later pickup. The customer can travel to the store and present an identifying card and pick up the item.

4 Claims, 2 Drawing Sheets

SYSTEM AND METHOD FOR VISIBILITY TO CONSUMER

This application claims priority from U.S. application No. 60/597,341 filed Nov. 25, 2006, which application is incorporated herein by reference for all purposes.

BACKGROUND

Much attention has been paid in recent years to consumer retailing and ways to streamline retailing and maximize its profitability. The rise of the World Wide Web, for example, has prompted bricks-and-mortar retailers to try to find ways to compete with web-only retailers. Retailers have tried many approaches to keeping track of inventory, both so as to keep from running out of particular stock-keeping units (SKUs) and so as to let a consumer know whether a particular SKU is in stock.

A typical method of inventory tracking is the use of bar-code scanners at checkout counters 13 (FIG. 1). Each item purchased is scanned at the checkout counter 13. The scan information (typically a UPC or uniform product code) is used both to look up a price and to keep a record (in a database server 17) that a particular item has been sold. Restocking (through door 16, FIG. 1) involves identifying the UPC for newly stocked merchandise and making a record in database server 17 of the number of items restocked. In this way the retailer tries to keep track of the number of items in stock. It is rather like measuring how much water enters a bathtub and measuring how much leaves the bathtub via the drain, so as to work out how much water is in the bathtub at any particular moment.

This approach to measuring inventory relies on knowing the precise inventory at some starting point. This approach will become less and less accurate with the passage of time because of "inventory shrinkage", defined to include theft by store employees and theft by customers.

A pure-play mail-order merchant is able to avoid theft by customers for the simple reason that customers are not allowed in the warehouse. Such a merchant will typically have a web site with a virtual "shopping cart" into which the customer "places" items of merchandise for purchase. At the time the customer selects an item, the mailorder shopping cart system will look to see if the item is "in stock and will annunciate any out-of-stock condition to the customer. This minimizes the risk of a customer being told that he or she will receive the merchandise promptly and then receiving it later than promised due to some out-of-stock condition.

As mentioned above, some bricks-and-mortar retailers have tried to win customers away from other retail channels by offering services that involve web-based ordering and in-store pickup. In a typical system, the customer visits a web site for a nationwide chain retailer, and selects an item of merchandise. The customer then indicates his or her geographic location, and the system checks the store inventory for the store or stores that fall within convenient driving distance. Assuming the item is in stock at a store that is acceptable to the customer, the customer places an order for the item.

Importantly, the customer is told not to travel to the store until after a confirming email message is received.

The next steps are not visible to the customer. Store personnel in the store go to the stocking location for the merchandise and "pick the item, transporting it to a secure location such as a customer service counter. Store personnel then enter a message into the system, indicating that the item of merchandise has been located and put in the secure location. Only then is the customer sent the confirming message.

The reason for the confirming message is, of course, that until store personnel have actually laid eyes upon the item of merchandise, there is no way to be sure that the item was actually in stock. The item could, for example, have been shoplifted the day before. Or at the time of restocking, stocking personnel might have mis-counted the items being stocked. Or the item might have been stolen by a store employee. Reinforcing all of these possibilities is the reality that the "bathtub" approach of counting items as they enter and leave the store is not a certain indicator of what is in stock and what is not.

More subtly, even if there were no shoplifting, no mis-counting, and no employee theft, there are things that could go wrong with a web-based order for in-store pickup. For example, the item which the customer desires to purchase may actually be physically present in the store and yet the store personnel whose task it is to "pick the item may be unable to find it. For example:

the item may have two or more intended stocking locations, such as a mid-aisle location and also an "end cap" 24 (FIG. 1), yet the store personnel may be aware of only one of the two locations.

the item may be out of its usual stocking location due to some error in stocking or restocking.

the item may be in a "back-stock" location (such as a high shelf or low cabinet) where is is not easy to see.

In any of these situations, as well as other situations that can commonly arise, the store personnel whose task it is to "pick the item may not be able to find it. It will then not be possible to send the confirming message to the consumer. The sale will then likely be lost, because the consumer in frustration may instead purchase from a pure-play mailorder retailer or from a different bricks-and-mortar retailer.

Those skilled in the art will appreciate that there are other drawbacks to the system just described, in addition to the drawbacks discussed.

It would be extremely helpful if a system could be devised that would facilitate web-based purchase of merchandise from a bricks-and-mortar retailer for in-store pickup, that would avoid the drawbacks of previous systems. It would be still more helpful if such a system also enabled other economies and advantages to the bricks-and-mortar retail process.

SUMMARY OF INVENTION

A system for use by a bricks-and-mortar retailer has RF tags on items of merchandise ("item tags") and has large antennas in large areas of a retail space. Intermediate tags are communicatively coupled to the large antennas and also to the item tags. The locations of the intermediate tags are known, and thus the location of an item is known because it is communicatively coupled with one of the intermediate tags. A customer visits a web site and orders an item for later pickup at the store. Store personnel then go to the location of the item, pick the item, and put it at a store location for later pickup. The customer can travel to the store and present an identifying card and pick up the item.

DESCRIPTION OF THE DRAWING

The invention will be described with respect to a drawing in several figures, of which.

DETAILED DESCRIPTION

Figure 1:
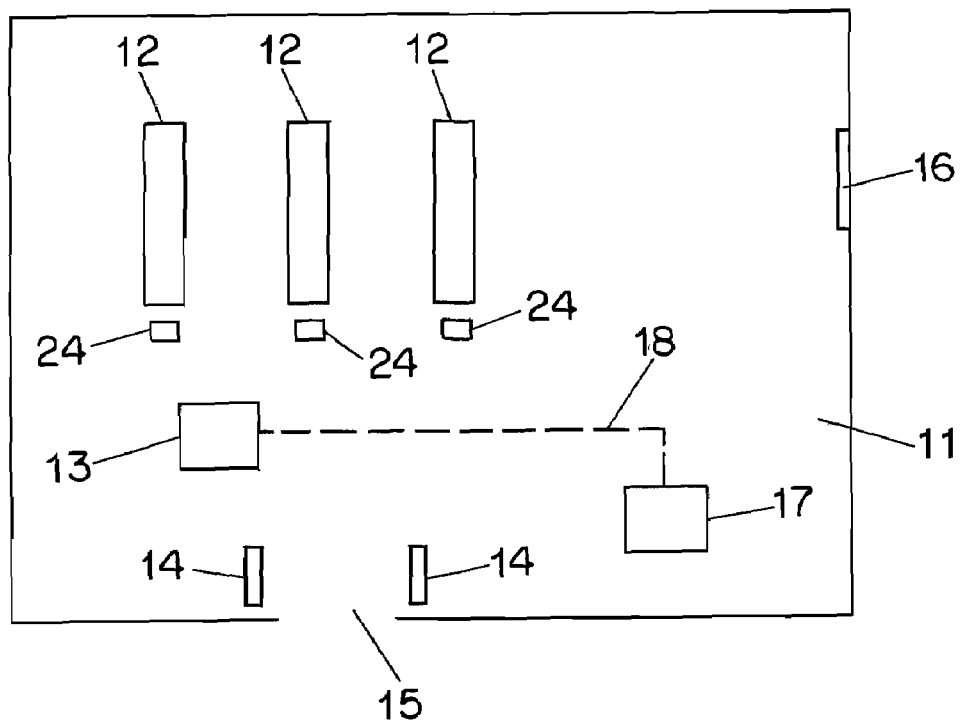
FIG. 1 shows a floor plan of a bricks-and-mortar retailer.

A store 10 has an exemplary retail space 11 (FIG. 1) which includes gondolas 12 with end caps 24. Stocking is by means of doorway 16. A checkout register 13 is communicatively coupled with a database server 17 via communications link 18. Antitheft sensors 14 protect main doorway 15.

Within the retail space (as detailed in FIG. 2) are large antennas 21. There may be a single large antenna 21 but in an exemplary arrangement there are several large antennas, perhaps one for each gondola 12. Each gondola 12 may be divided up into zones, each with its own large antenna 21.

Items of merchandise 23 each have their own item tag. Each item tag is intended to be within a communication area of an intermediate tag 20. Each intermediate tag 20 is in turn in communication with a large antenna 21. In this way, the system can localize a particular item of merchandise 23 to within the communication area of an intermediate tag 20 that has responded to a query. Optionally the intermediate tags 20 may have LEDs (light-emitting diodes) to assist in the picking process. Optionally, for some of the SKUs within the retail space 11, there may be an intermediate tag 20 associated with each such SKU, permitting a very fine-grained localization of a particular item of merchandise.

It will be appreciated that the system described permits locating an in-stock item even if it might be in either of two stocking locations (e.g. end cap and mid-aisle). The system described will not have a "false positive", that is, a false report that an item is in stock when it in fact is not in stock (due e.g. to shoplifting or employee theft).

Figure 2:
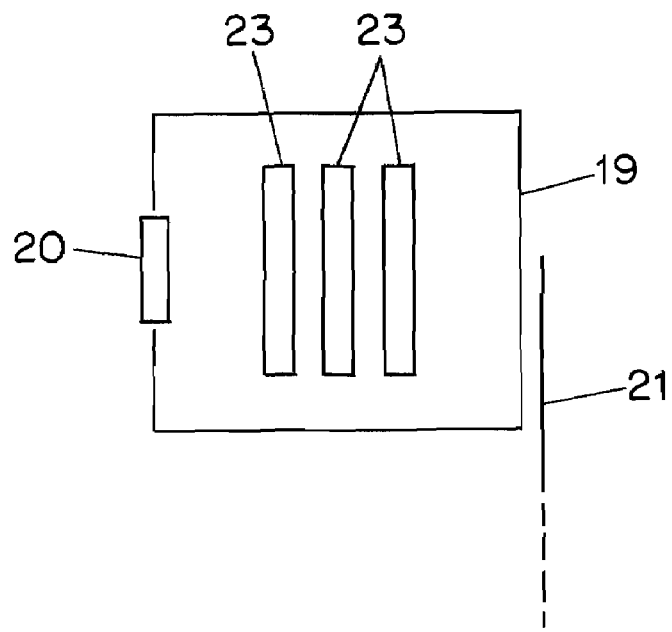
FIG. 2 shows a stocking area for a particular stock-keeping unit.

It is now possible to describe a typical method of providing merchandise visibility to the consumer. Item tags will already have been provided on items of merchandise 23 (FIG. 2). One or more large antennas 21 (FIG. 2) will already have been provided in respective locations within the retail space 11 (FIG. 1). Intermediate tags 20 (FIG. 2), communicatively coupled with the large antennas 21 and with the item tags of items 23, are provided. Each intermediate tag 20 is associated with a respective area 19 (FIG. 2).

The tags and antennas employed in this system can, for example, be those described in U.S. application No. 60/595,156, U.S. application No. 60/707,218, and U.S. application Ser. No. 11/423,509, published as US publication number YY, incorporated herein by reference for all purposes.

Figure 3:
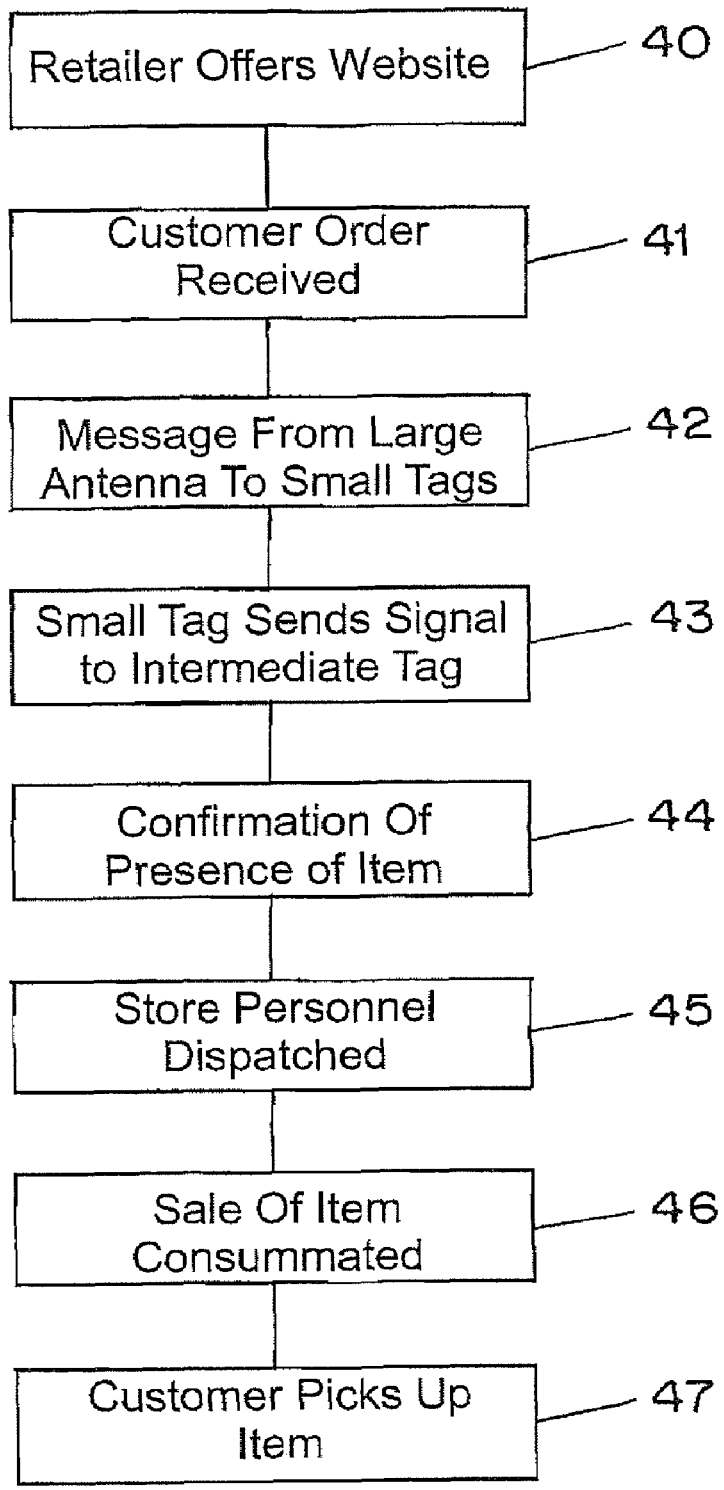
FIG. 3 shows a sequence of steps of an exemplary purchasing process.

The retailer offers (box 40, FIG. 3) a web site by which a customer may place an order for merchandise for later pickup at the retail space 11. A customer order is received (box 41) by the retailer from a customer. The order is for a first stock-keeping unit of merchandise. One or more messages are transmitted (box 42) by means of the one or more large antennas, indicative of the first stock-keeping unit of merchandise. The intermediate tags 20 in turn listen for responses from items of merchandise. Assuming the item is in stock, then at least one item 23 will respond and the response will be received (box 43) at at least one of the intermediate tags. This then permits confirming (box 44) the presence of a first item of merchandise having a tag matching the first stock-keeping unit of merchandise, and thereby localizing the first item of merchandise to a respective location for the at least one of the intermediate tags. Store personnel are then dispatched (box 45) to pick the item; store personnel go to the respective location for the at least one of the intermediate tags, pick the first item of merchandise, and place it at a secure location at the retail space 11. The sale of the first item of merchandise is consummated (box 46), and the customer is permitted (box 47) to pick up the first item of merchandise at the retail space 11.

In one variant, the consumer might be permitted to "pick the merchandise himself or herself, rather than having store personnel do the "picking". As another example, the consumer might be provided with an identifying card which is presented at the secure location and which permits the customer to pick up the item very quickly and efficiently, the identifying card communicating with an intermediate tag or with a large antenna.

Those skilled in the art will readily devise myriad variations and obvious improvements which depart in no way from the invention, and all of which are intended to be embraced by the claims below.

The invention claimed is:

1. A method for use with a retail space, the method comprising the steps of:
   providing item tags on items of merchandise;
   providing one or more large antennas in respective locations within the retail space;
   providing intermediate tags, communicatively coupled with the large antennas and with the item tags, each intermediate tag associated with a respective area;
   offering a web site by which a customer may place an order for merchandise for later pickup at the retail space;
   receiving, by the web site, a customer order by a customer for a first stock-keeping unit of merchandise;
   transmitting, by means of the one or more large antennas, one or more first messages indicative of the first stock-keeping unit of merchandise to said item tags;
   receiving said one or more first messages by one or more item tags that correspond to the stock-keeping unit of merchandise;
   transmitting, by means of the one or more item tags that correspond to the stock-keeping unit of merchandise, one or more second messages to said intermediate tags;
   receiving, at at least one of the intermediate tags, the one or more second messages from said item tags indicative of the first stock-keeping unit of merchandise;
   by the at least one of the intermediate tags, confirming the presence of a first item of merchandise having a tag matching the first stock-keeping unit of merchandise, and thereby localizing the first item of merchandise to a respective location for the at least one of the intermediate tags;
   by store personnel, going to the respective location for the at least one of the intermediate tags, picking the first item of merchandise, and placing it at a secure location at the retail space;
   consummating a sale of the first item of merchandise; and
   after the consummation of the sale, permitting the customer to pick up the first item of merchandise.

2. The method of claim 1 wherein the one or more messages from said item tags are not transmitted to and received directly by the large antenna.

3. The method of claim 1 wherein the intermediate tag has an LED.

4. The method of claim 1 wherein at least one intermediate tag is associated with a particular SKU.

* * * * *